(12) United States Patent
Wienand et al.

(10) Patent No.: US 6,712,987 B2
(45) Date of Patent: Mar. 30, 2004

(54) PROCESS FOR MANUFACTURING AN ELECTRICAL RESISTOR WITH AT LEAST TWO CONNECTION CONTACT PADS ON A SUBSTRATE WITH AT LEAST ONE RECESS

(75) Inventors: Karlheinz Wienand, Aschaffenburg (DE); Karlheinz Ullrich, Gross-Umstadt (DE); Stefan Dietmann, Hanau (DE)

(73) Assignee: Heraeus Electro-Nite International N.V., Houthalen (BE)

( * ) Notice: Subject to any disclaimer, the term of this patent is extended or adjusted under 35 U.S.C. 154(b) by 248 days.

(21) Appl. No.: 09/731,569

(22) Filed: Dec. 7, 2000

(65) Prior Publication Data

US 2001/0000298 A1 Apr. 19, 2001

Related U.S. Application Data

(62) Division of application No. 09/396,186, filed on Sep. 14, 1999, now abandoned.

(30) Foreign Application Priority Data

Sep. 14, 1998 (DE) .......................... 198 41 929

(51) Int. Cl.$^7$ ................................. B44C 1/22
(52) U.S. Cl. ............................ 216/100; 216/13; 216/17; 216/41; 338/22 R; 338/25
(58) Field of Search ............. 216/100, 13, 17, 216/41

(56) References Cited

U.S. PATENT DOCUMENTS

| | | | |
|---|---|---|---|
| 3,684,996 A | 8/1972 | Schwarz | 338/18 |
| 3,801,949 A | 4/1974 | Larrabee | 338/22 R |
| 4,276,535 A | 6/1981 | Mitsuyu et al. | 338/22 R |
| 4,436,593 A | * 3/1984 | Osborne et al. | 205/119 |
| 4,482,426 A | * 11/1984 | Maynard et al. | 216/92 |
| 4,574,263 A | * 3/1986 | Liddiard | 338/18 |
| 4,906,965 A | 3/1990 | Murata et al. | 338/25 |
| 5,053,740 A | * 10/1991 | Schultz et al. | 338/25 |
| 5,349,238 A | * 9/1994 | Ohsawa et al. | 257/736 |
| 5,394,356 A | * 2/1995 | Yang | 365/177 |
| 5,446,437 A | 8/1995 | Bantien et al. | 338/25 |
| 5,798,684 A | 8/1998 | Endo et al. | 338/22 R |
| 5,831,512 A | 11/1998 | Wienand et al. | 338/25 |
| 5,898,359 A | 4/1999 | Ellis | 338/47 |

FOREIGN PATENT DOCUMENTS

| | | |
|---|---|---|
| DE | 2 302 615 | 8/1974 |
| DE | 34 30 075 A1 | 2/1986 |
| DE | 38 29 765 A1 | 3/1989 |
| DE | 30 15 356 C2 | 4/1989 |
| DE | 38 29 195 A1 | 3/1990 |
| DE | 39 27 735 A1 | 2/1991 |
| DE | 197 53 642 A1 | 6/1998 |
| EP | 0 446 667 A2 | 2/1991 |
| WO | WO 98/26260 | 12/1997 |

* cited by examiner

Primary Examiner—Nadine Norton
Assistant Examiner—Shamim Ahmed
(74) Attorney, Agent, or Firm—Akin Gump Strauss Hauer & Feld LLP

(57) ABSTRACT

A temperature-dependent measuring resistance with low mass and thereby rapid response time has a conductor path provided with at least two connection contact pads. The conductor path is applied to a metal substrate with an insulation layer (membrane) situated thereon. A portion of the conductor path spans a recess of the substrate in a bridge-like manner. The conductor path is selectively covered by a passivation layer up to its connection contact pads.

8 Claims, 1 Drawing Sheet

PROCESS FOR MANUFACTURING AN ELECTRICAL RESISTOR WITH AT LEAST TWO CONNECTION CONTACT PADS ON A SUBSTRATE WITH AT LEAST ONE RECESS

CROSS-REFERENCE TO RELATED APPLICATION

This is a divisional application of U.S. patent application Ser. No. 09/396,186, filed Sep. 14, 1999, now abandoned.

BACKGROUND OF THE INVENTION

The invention concerns an electrical resistor, in particular a temperature-dependent measuring resistance with rapid response time, having a conductor path provided with at least two connection contact pads, arranged on an electrically insulating surface of a substrate, wherein a portion of the conductor path spans at least one recess of the substrate in a bridge-like manner, and the conductor path is arranged in a plane. The invention also relates to a process for manufacturing the electrical resistor.

A temperature-dependent measuring resistance with rapid response time is known from German published patent application DE 197 53 642 A1, wherein the resistor is at least partially arranged on an electrically insulating surface of a ceramic substrate, wherein a portion of the conductor path spans in a bridge-like manner a recess situated in the substrate, and the remaining portion of the conductor path is provided with connection contact pads in the edge area of the substrate adjacent to the recess. The conductor path comprises a platinum or a gold layer, wherein the conductor path itself is provided with a cover layer of glass. The connection contact pads are left exposed for the purpose of subsequent contacting. The relatively expensive construction proves to be problematic in this case, especially in view of the structuring of ceramics or glass as a substrate.

Furthermore, a temperature sensor is known from European published patent application EP 0 446 667 A2, which sensor has electrically conducting conductor paths applied in meander form by thin layer technology in a measurement window on an electrically insulating substrate having a low radiation absorption, whose end points are connected to a measurement device circuit. The overall area of the conductor paths in its projection on the plane of the substrate amounts to a 20% coverage ratio of the surface of the measurement window, so that the conductor paths can emit absorbed radiation without interference with other conductor paths. Either the sum of surfaces of the measurement window and the substrate surrounding the measurement window stands in an area ratio of >4:1 to the edge surface bordering the substrate in the measurement window area, or the substrate is substantially etched away under the conductor paths in the measurement window. Then, the cross-sectional area of the reversing bends of the conductor paths lying on the substrate is greater than the cross-sectional area of the conductor paths, so that a resistance action as a consequence of the temperature of the substrate on the conductor path is effectively prevented. With this temperature sensor, temperature measurements in the range of −70 to +50° C. are possible.

Furthermore, a temperature measurement arrangement (radiation thermometer) is known from German published patent application DE 39 27 735 A1, the arrangement having a temperature-sensitive thin layer resistor, which is applied in meander form to a sheet of plastic which is stretched over a hollow in the substrate material. A circuit board or a carrier made of epoxy resin is provided as a substrate. Such a temperature measurement arrangement, owing to the low thermal load capacity, is only suited for use in an environment with temperatures below 200° C.

Still further, from German published patent application DE-OS 23 02 615, a temperature-dependent electrical resistor is known, made of resistance material which forms a coiled conductor path as a thin layer, which is applied to a thin sheet. The sheet, which is made of polymeric plastic, spans with its uncoated side a recess in a carrier element which is made of copper, for example, wherein the recess has the same shape as the conductor path and aligns with it in a direction perpendicular to the sheet plane. The temperature arrangement here is one which requires a high technical expenditure for the requisite precise coverage of conductor path and recess.

From German patent DE 30 15 356 C2, it is known that electric switches in thick layer technology are preferably manufactured on ceramic, plate-shaped substrates by printing of pastes, whose active substances consist of metal powders, glass or glass-ceramic powders, or mixtures of glass and metal oxides. For manufacturing rapidly responding sensors for temperature measurement, temperature-sensitive thick layer resistances are applied to self-supporting layers, which have arisen by paste screen printing with the aid of a filler material which is gasifiable under the effect of temperature, and which cover a subsequently formed hollow space. Here, it is a question of a comparatively expensive process.

Furthermore, from German published patent application DE 38 29 765 A1 or U.S. Pat. No. 4,906,965, a platinum temperature sensor is known, in which a platinum resistance path with at least two ends is applied on a surface of at least one ceramic substrate. For manufacture, a platinum conductor path is applied in the form of a meander zigzag pattern on the inner surface of a ceramic sheet and subsequently shaped into a roll, wherein breaks with alignment bridges are also provided between adjacent points of the conductor path pattern for purposes of alignment. The ceramic substrate is fired together with the applied platinum resistance. The platinum resistance is made resistant to the ambient atmosphere and moisture by sealing measures. In addition, after the alignment the passage openings and conduits requisite for this are also sealed off by means of ceramic coating or glass paste. The comparatively high heat capacity proves to be problematic with such an arrangement, which does not, without more, make possible a rapid response with sudden temperature changes, and reproduces an exact measured value only after completing a transition function.

A further embodiment of a resistor element as rapid temperature sensor is known from German published patent application DE 38 29 195 A1. Here, the resistance element is configured as a layer resistor made of platinum paste, which is accommodated in a bubble made of glass ceramic, which arches over an electrically insulating ceramic substrate. Here, the self-supporting arched resistance layer is seen as problematic in respect to mechanical stresses, such as shock, pressure or vibration, with applications in harsh environments.

SUMMARY OF THE INVENTION

An object of the invention is to create a measuring resistance which has the simplest construction possible, and which can be produced using economical processes. This object is achieved in accordance with the present invention for an electrical resistor in that the substrate is made of metal and is provided with an applied insulation layer as a membrane, wherein the conductor path is arranged on the membrane.

The robust construction proves to be especially advantageous, wherein particularly the security against failure or disturbance has an advantageous effect in consumer goods applications.

In a preferred embodiment of the invention, the conductor path is selectively covered by a passivation layer up to its connection contact pads. It proves to be advantageous herein that the Pt meander, which is manufactured by known photolithographic and PVD processes, is thereby protected from the actions of foreign substances from without and retains its stable resistance value for exact temperature recording.

Furthermore, the substrate advantageously has a thickness in the range of about 0.15 to 0.6 mm, preferably about 0.2 to 0.25 mm. From this there results a particularly rapid response time. Preferably, the metal of the substrate comprises an iron-nickel alloy, preferably FeNi42 (alloy 42). This results in an economical substrate. Moreover, it is possible to use a substrate made of an iron-nickel-cobalt alloy, preferably FeNi28Co18 (VACON 10).

Alternatively, the metal of the substrate can comprise steel 1.4767 (FeCr20Al5). It is also possible to use a substrate of steel 1.4541 or steel 1.4571. Alternatively, an electrical resistor can be used in which the metal of the substrate comprises nickel.

The plate-shaped membrane, functioning as an insulation layer, at least partially covers the recess within the substrate, wherein the membrane comprises SiO, MgO, ZrO, $Si_3N_4$, $TiO_2$, $Al_2O_3$ or a mixture of these materials. The thickness lies in the range of about 0.5 to 10 $\mu$m, preferably about 2 to 2.5 $\mu$m.

In addition, it is also possible to form the membrane sandwich-like from a combination of the previously named oxides or oxide mixtures. Such a sandwich-like configuration has the advantage that it can be constructed to be especially stable against thermal and mechanical stresses.

The conductor path preferably comprises a platinum layer having a thickness in the range of about 0.1 to 6 $\mu$m, preferably about 0.3 to 0.6 $\mu$m. Owing to the slight thickness of the platinum layer, there results very little thermal inertia, so that advantageously a rapid responsiveness of the sensor should be attained. The conductor path is provided with a passivation layer of SiO or $Al_2O_3$ to protect its surface, wherein this layer has a thickness in the range of about 0.3 to 10 $\mu$m. Owing to the slight thickness, the rapid responsiveness also will not be impaired.

In a further preferred embodiment, an etching stop layer is applied between the substrate and membrane, which layer is preferably made of platinum or titanium in a thickness of about 0.1 to 6 $\mu$m, preferably 2.5 to 3 $\mu$m.

The objective of the invention is achieved for a process for manufacturing an electrical resistor, particularly a temperature-dependent measuring resistance having a small mass, with a conductor path which is provided with at least two connection contact pads which are arranged on an electrically insulating surface of a substrate, wherein a portion of the conductor path spans at least one recess of the substrate in a bridge-like manner, and the conductor path is arranged in one plane, in that a substrate constructed in the shape of a rectangular prism is provided on its front side with a metal etching stop layer and on its reverse side with a photolithographic enamel structuring, wherein a wet chemical free etching takes place from the reverse side of the metal substrate up to the previously applied metal etching stop.

This free etching preferably takes place by spray etching with the aid of an $FeCl_3$ solution, wherein the etching stop, membrane and passivation layers are preferably applied by PVD or CVD processes. Here, it proves to be particularly advantageous that the known process sequences of metal structuring in the lead frame etching art also find application here.

BRIEF DESCRIPTION OF THE DRAWING

The foregoing summary, as well as the following detailed description of the invention, will be better understood when read in conjunction with the appended drawing. For the purpose of illustrating the invention, there are shown in the drawing embodiment(s) which are presently preferred. It should be understood, however, that the invention is not limited to the precise arrangements and instrumentalities shown. In the drawings:

The sole FIGURE (FIG. 1) shows in an exploded schematic representation the structural composition of an electrical resistor according to the invention.

DETAILED DESCRIPTION OF THE INVENTION

Figure 1:
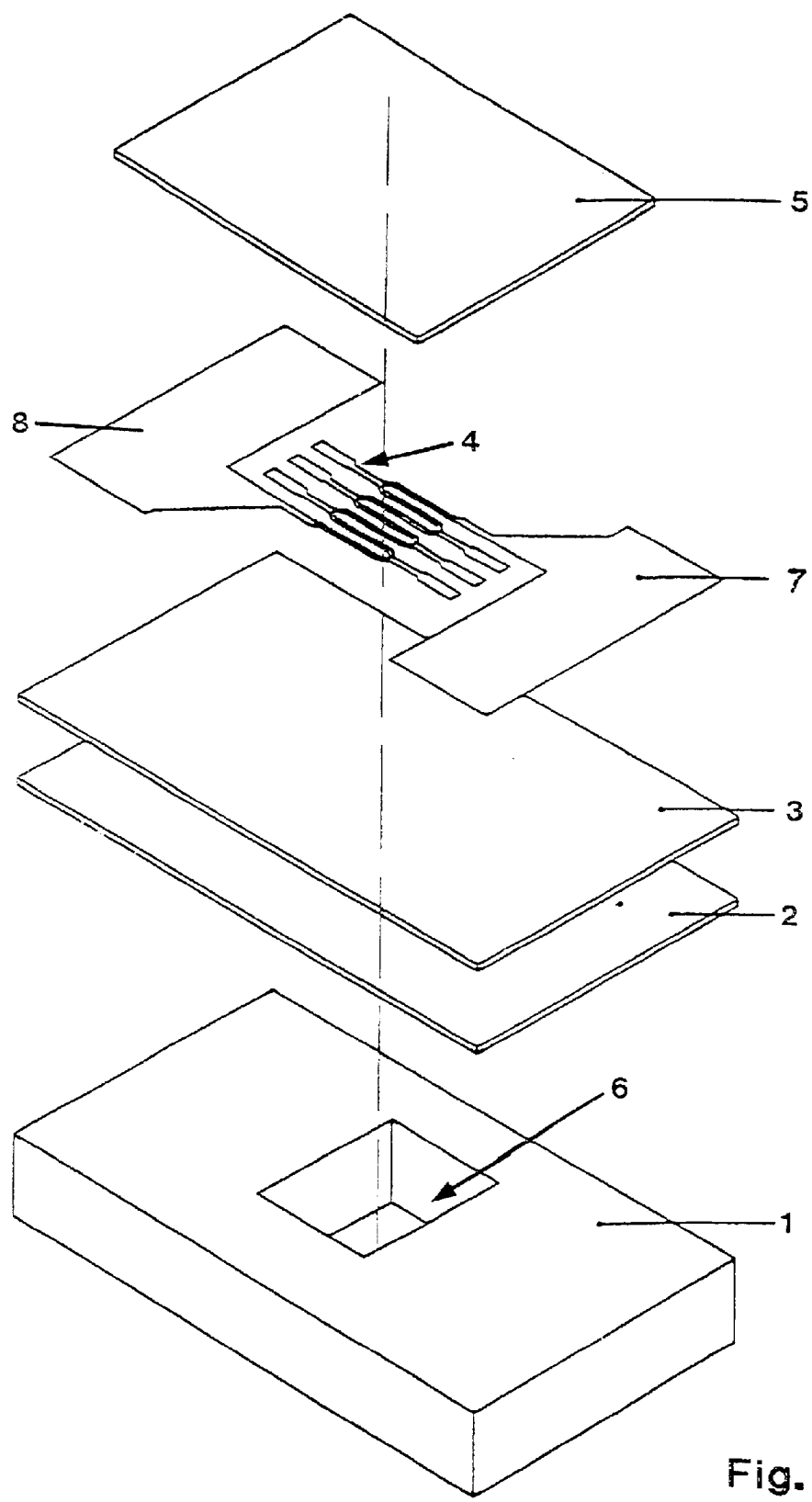

The substrate 1 comprises metal, preferably an iron-nickel alloy, and has a thickness in the range of about 0.15 to 0.6 mm. The alloy FeNi42 (alloy 42) with a thickness of 0.2 mm has proven especially suitable. On this substrate, a metal etching stop 2 is applied, preferably comprising a platinum layer or a Ti layer with a thickness of about 2.5 to 3 $\mu$m, as well as the actual membrane layer 3, which comprises an electrically insulating material, for example SiO, MgO, ZrO, $Si_3N_4$, $TiO_2$, $Al_2O_3$, or mixtures of these materials, having a thickness in the range of about 0.5 to 10 $\mu$m. Preferably, the membrane 3 has a thickness of 2.5 $\mu$m. The conductor path 4 preferably comprises a platinum layer and has a thickness in the range of about 0.1 to 6 $\mu$m, preferably about 0.3 $\mu$m to 0.6 $\mu$m. The conductor path 4 is selectively covered on its outer surface with a passivation layer 5, which comprises an SiO or $Al_2O_3$ layer, which has a thickness in the range of about 0.3 to 10 $\mu$m. The recess in substrate 1 spanned by the conductor path in a bridge-like manner is designated with the reference numeral 6. The recess is preferably constructed as a through passage, i.e., window-like.

The connection contact pads 7, 8 are left free for an electrical contacting after this process and are not covered by the passivation layer 5.

The etching stop layer 2 applied between the substrate and the membrane layer 3 can also be dispensed with for special uses. In this case, the membrane layer 3 itself assumes the function of the actual etching stop layer.

The low thermal mass of the resistor usable as a sensor is effected by a wet chemical free etching from the reverse side of the substrate 1 up to the metal etching stop, wherein the free etching takes place by spray etching with an $FeCl_3$ solution. For this purpose, a photolithographic enamel structuring of the reverse side of the metal substrate 1 takes place beforehand in accordance with the known prior art.

In accordance with FIG. 1, the passivation layer 5 is situated on the structured conductor layer 4. The passivation layer 5 comprises an electrically insulating material and is preferably applied to the conductor path 4 by a PVD or CVD process. The passivation layer 5 is preferably made of aluminum oxide. However, it is also possible to use a passivation layer made of silicon oxide. The passivation layer 5 is applied to the structured conductor layer 4 such that the connection contact pads remain free.

It will be appreciated by those skilled in the art that changes could be made to the embodiment(s) described above without departing from the broad inventive concept thereof. It is understood, therefore, that this invention is not limited to the particular embodiment(s) disclosed, but is intended to cover modifications within the spirit and scope of the present invention as defined by the appended claims.

We claim:

1. A process for manufacturing a temperature-dependent measuring resistor with low mass having an electrical conductor path with at least two connection contact pads arranged on an electrically insulating surface of a metal substrate, wherein a portion of the conductor path and of the electrically insulating surface span at least one recess of the substrate in a bridge manner and the conductor path is arranged in a plane, the process comprising:

providing a metal etching stop layer between the metal substrate and the electrically insulating surface of the metal substrate, wherein the metal etching stop layer comprises a material selected from the group consisting of Ti, Pt, Ni, and combinations thereof;

providing the metal substrate on its reverse side with a photo-lithographic enamel structuring; and conducting a wet chemical etching from the reverse side of the substrate up to the previously applied metal etching stop layer.

2. The process according to claim 1, wherein the wet chemical etching from the reverse side of the metal substrate up to the metal etching stop layer imparts a low thermal mass to the resistor.

3. The process according to claim 2, wherein the wet chemical etching comprises spray etching with an $FeCl_3$ solution.

4. The process according to claim 1, wherein the metal etching stop layer is applied to the metal substrate in a thickness of about 0.1 to 0.6 $\mu$m.

5. The process according to claim 1, wherein the metal etching stop layer is applied to the metal substrate by PVD or CVD processes.

6. The process according to claim 1, wherein the electrically insulating surface comprises a material selected from the group consisting of SiO, MgO, ZrO, $Si_3N_4$, TiO, $Al_2O_3$, and combinations thereof.

7. The process according to claim 1, wherein the electrically insulating surface is applied to the metal etching stop layer in a thickness about 0.5 to 10 $\mu$m.

8. The process according to claim 1, wherein the metal substrate comprises a material selected from the group consisting of iron-nickel alloy, iron-nickel-cobalt alloy, steel 1.4767, steel 1.4541, steel 1.4571 and nickel.

* * * * *